United States Patent [19]

Jeong

[11] Patent Number: 5,617,140

[45] Date of Patent: Apr. 1, 1997

[54] METHOD FOR ADJUSTING LENS OFFSET OF A VIDEO CAMERA

[75] Inventor: Byeong-Sun Jeong, Seoul, Rep. of Korea

[73] Assignee: LG Electronics Inc., Seoul, Rep. of Korea

[21] Appl. No.: 575,619

[22] Filed: Dec. 20, 1995

[30] Foreign Application Priority Data

Dec. 22, 1994 [KR] Rep. of Korea ............ 36073/1994

[51] Int. Cl.$^6$ ................................ H04N 5/232
[52] U.S. Cl. .................. 348/347; 348/175; 396/79
[58] Field of Search .................. 348/175, 345, 348/347, 351, 354, 358; 354/400, 402, 409; H04N 5/232; G03B 13/00, 17/00

[56] References Cited

U.S. PATENT DOCUMENTS 4,991,944  2/1991  Hirao et al. ............ 348/347
5,274,223  12/1993  Hata ..................... 354/402
5,352,882  10/1994  Koyanagi et al. ........ 354/400

FOREIGN PATENT DOCUMENTS 6141220  5/1994  Japan ................ H04N 5/232

*Primary Examiner*—John K. Peng
*Assistant Examiner*—Jeffrey S. Murrell
*Attorney, Agent, or Firm*—Birch, Stewart, Kolasch & Birch, LLP

[57] ABSTRACT

A method for adjusting the lens offset of a video camera, in which the offset value of the lens is calculated quickly and exactly during only a small travel of a focus lens and a zoom lens, thereby shortening the time required for calculating the offset value conventionally involving a large travel of the focus lens and the zoom lens, preventing an error, and further curtailing the cost of production.

3 Claims, 5 Drawing Sheets

METHOD FOR ADJUSTING LENS OFFSET OF A VIDEO CAMERA

BACKGROUND OF THE INVENTION

1. Field of the Invention

The present invention relates to a method for adjusting a lens offset of a video camera, and particularly to an improved method for adjusting a lens offset capable of advantageously adjusting the offset value of the lens through small travel of a focus lens and a zoom lens.

2. Description of the Conventional Art

Referring to FIG. 1, there is shown a block diagram of a conventional video camera. As shown in the drawing, the conventional video camera includes a lens group 10 having a focus lens and a zoom lens; an iris 20 for controlling the light quantity incident from the lens group 10; a vidicon 30 for forming an optical image of an object incident through the iris 20 and convening the image into multiplexed chrominance signals; a .sampling and gain control unit 40 for dividing the multiplexed chrominance signals outputted from the vidicon 30 into luminance signals and color signals, and controlling the gains thereof; a video signal processing unit 50 for encoding the luminance signals and the color signals outputted from the sampling and gain control unit 40 and outputting composite video signals; a focus evaluation calculating unit 60 for receiving the luminance signals outputted from the sampling and gain control unit 40 and calculating the focus evaluation corresponding to a region of the screen; and a key input unit 100 for selectively inputting the general operations of the video camera. The conventional video camera further includes a microprocessor 70 for adjusting the offset value of the lens according to the key data selected in the key input unit 100 and according to the evaluation value outputted from the focus evaluation calculating unit 6, and performing the control operation; a motor driving unit 80 for driving the lens group 10 according to the control signals of the microprocessor 70; and an iris driving unit 90 for controlling the opening amount of the iris 20.

Referring to the drawings, the operation of the conventional video camera with the above-described construction will be explained.

First, as shown in FIG. 1, when an optical image of an object is incident upon the vidicon 30 through the lens group 10 and the iris 20, the vidicon 30 forms an optical image of the object and outputs the image after converting it into the multiplexed chrominance signals.

Next, the sampling and gain control unit 40 receives the multiplexed signals outputted from the vidicon 30, and divides the signals into luminance signals and color signals. After signal division, the sampling and gain control unit 4 controls the gains thereof and outputs them to the video signal processing unit 50. The luminance signals and the color signals received by the video signal processing unit 50 are encoded into a composite video signal and outputted.

The focus evaluation calculating unit 60 receives the luminance signals from the sampling and gain control unit 40, and calculates the focus evaluation by detecting the amount of the high frequency component of the luminance signals within a region of the image. After calculation, the focus evaluation calculating unit 60 outputs the focus evaluation values to the microprocessor 70.

That is, if the focus is correctly adjusted, the high frequency component of the luminance signal reaches its maximum (the focus evaluation is large), while, if the focus is not correctly adjusted, the high frequency component of the luminance signals becomes small (the focus evaluation is small).

Therefore, the microprocessor 70 receives the focus evaluation values outputted from the focus evaluation calculation unit 60, and controls the motor driving unit 80 to perform an auto-focusing operation.

At this time, when a user pushes the function key through the key input unit 100, the microprocessor 70 calculates the offset value by comparing the theoretical trace curve of FIG. 2 set by the predetermined lens spec values Wx, Wy, Tx and Ty with the actual trace curve formed by moving the positions of the zoom lens and the focus lens, and controls the offset of the lens group 10.

Referring to FIGS. 3 and 4, the method for calculating the offset values of the focus lens and the zoom lens will now be described in detail.

First, when a user pushes the zoom key through the key input unit 100, the microprocessor 70 moves the position of the zoom lens of the lens group 10 by as much as the theoretical value Wx away from a start point, by driving the motor driving unit 80 (step 102).

Next, the microprocessor 70 drives the motor driving unit 80 and moves the position of the focus lens of the lens group 10 away from the start point. And then, the microprocessor 70 seeks the focusing position and stores the position as the first position f1 of the focus lens (step 104).

Thereafter, the microprocessor 70 drives the motor driving unit to move the position of the focus lens of the lens group 10 by as much as the theoretical value Ty toward the start point by driving the motor driving unit 80 (step 106). Again, the microprocessor 70 seeks the focusing position by moving the position of the zoom lens from that position toward the long-distance position and stores the focusing position as the first position z1 of the zoom lens (step 108).

After moving the position of the zoom lens by as much as the theoretical value Tx toward the start point (step 110), the microprocessor 70 moves the position of the focus lens toward the long-distance position, seeks the focusing position, and stores the position as the second position f2 of the focus lens (step 112).

As shown above, when the first and second positions f1 and f2 of the focus lens are obtained, the microprocessor 70 calculates an absolute value by subtracting the value of the second position f2 from the value of the first position f1. The obtained absolute value is compared with the predetermined threshold value (step 114).

If the calculated absolute value is larger than a threshold value, the microprocessor 70 stores the value of the second position f2 of the focus lens as the value of the first position f1 of the focus lens (step 116), and repeatedly performs the operations after step 104. Whereas, if the calculated absolute value is smaller than the threshold value, the microprocessor 70 compares the first and second positions f1 and f2 of the focus lens and the position of the zoom lens, which are calculated from the actual trace curve E, with the data detected from the theoretical trace curve A, and calculates the offset value (step 118).

However, the conventional method for adjusting the lens offset of the conventional video camera has disadvantages, in that it takes much time to calculate the offset value due to much travel of the focus lens and the zoom lens, and errors are easily committed as the motor for driving the focus lens and the zoom lens is frequently driven.

SUMMARY OF THE INVENTION

Therefore, it is an object of the present invention to provide a method for adjusting a lens offset which controls quickly and exactly the offset value of the lens through small travel of a focus lens and a zoom lens.

To achieve the above object, the present invention includes a first step for seeking the focusing positions i.e., the first and second positions of the zoom lens by moving the position of the focus lens by as much as the theoretical value away from the start point and moving the position of the zoom lens toward its long-distance position away from the start point; a second step for seeking the focusing point by moving the focus lens toward the long-distance position after moving the zoom lens to a middle point between the first and second positions of the zoom lens; a third step for seeking the focusing positions i.e., the third and fourth positions z3 and z4 of the zoom lens by moving the zoom lens from the first position z1 to the second position z2; and a fourth step for calculating an absolute value by subtracting the value of the fourth position z4 from the value of the third position z3, and calculating an offset value representing a focus position by comparing the absolute value with a predetermined threshold value.

DETAILED DESCRIPTION OF THE PREFERRED EMBODIMENTS

Figure 1:
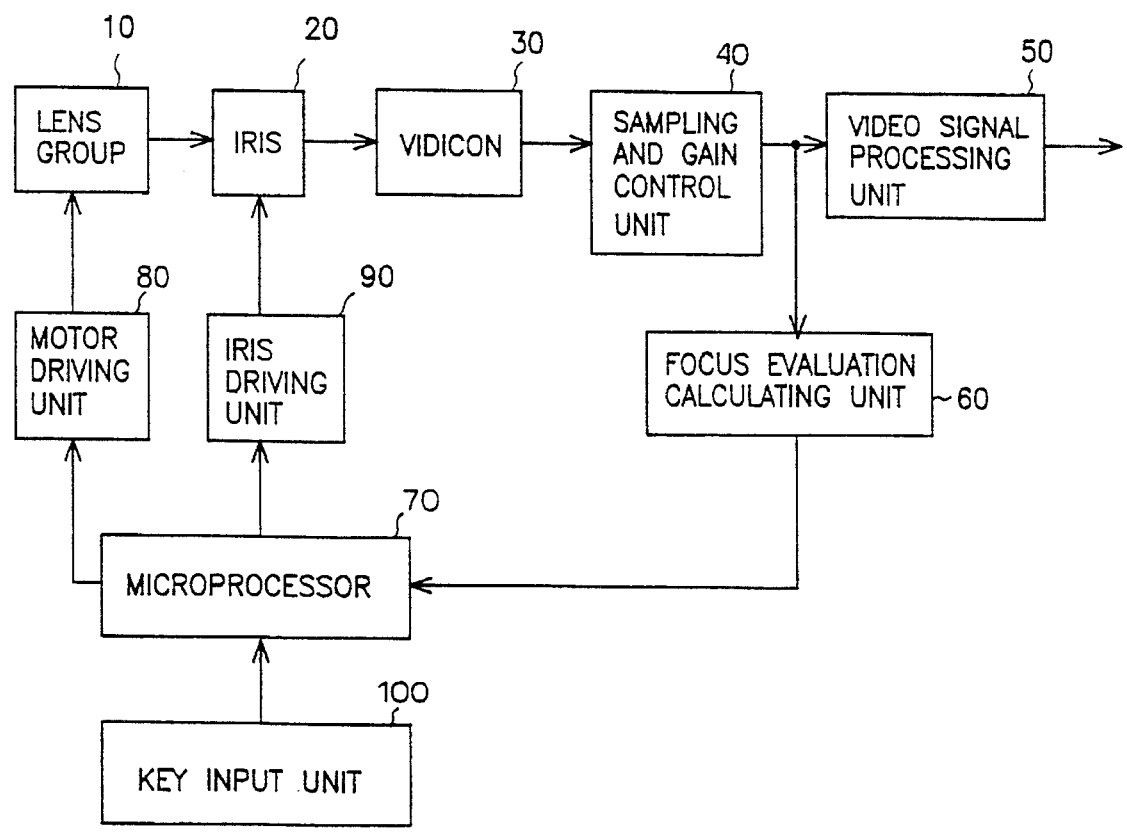
FIG. 1 is a block diagram of a conventional video camera.
Figure 2:
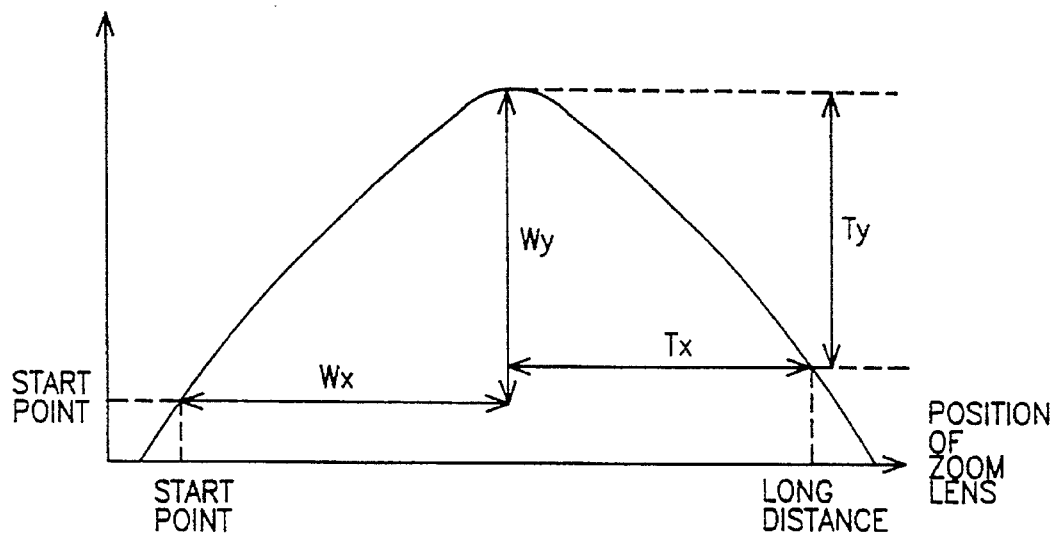
FIG. 2 is a theoretical trace curve of a focus lens position and a zoom lens position representing the conventional lens spec values Wx, Wy, Tx and Ty.
Figure 3:
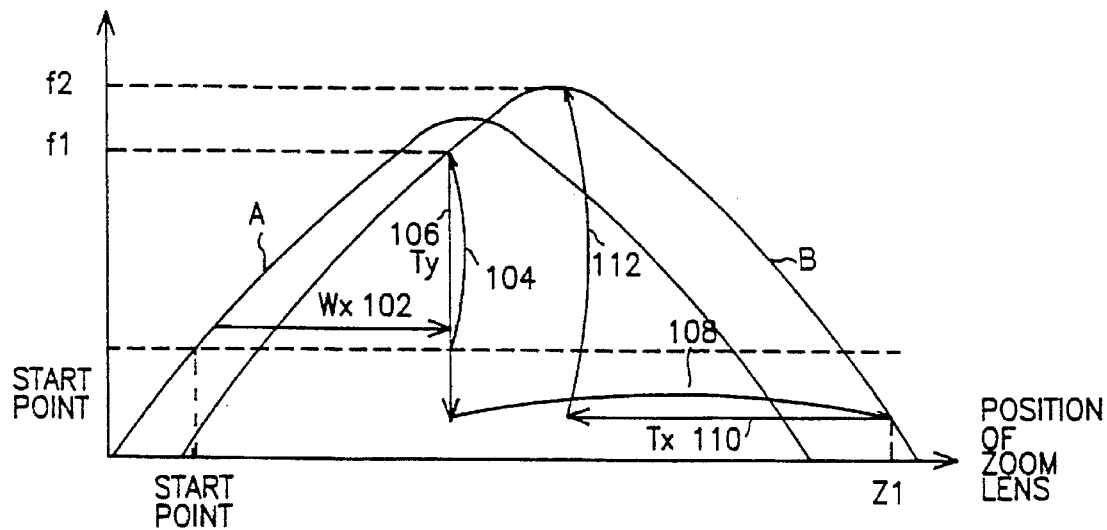
FIG. 3 is an actual trace curve of the conventional focus lens position and the zoom lens position.
Figure 4:
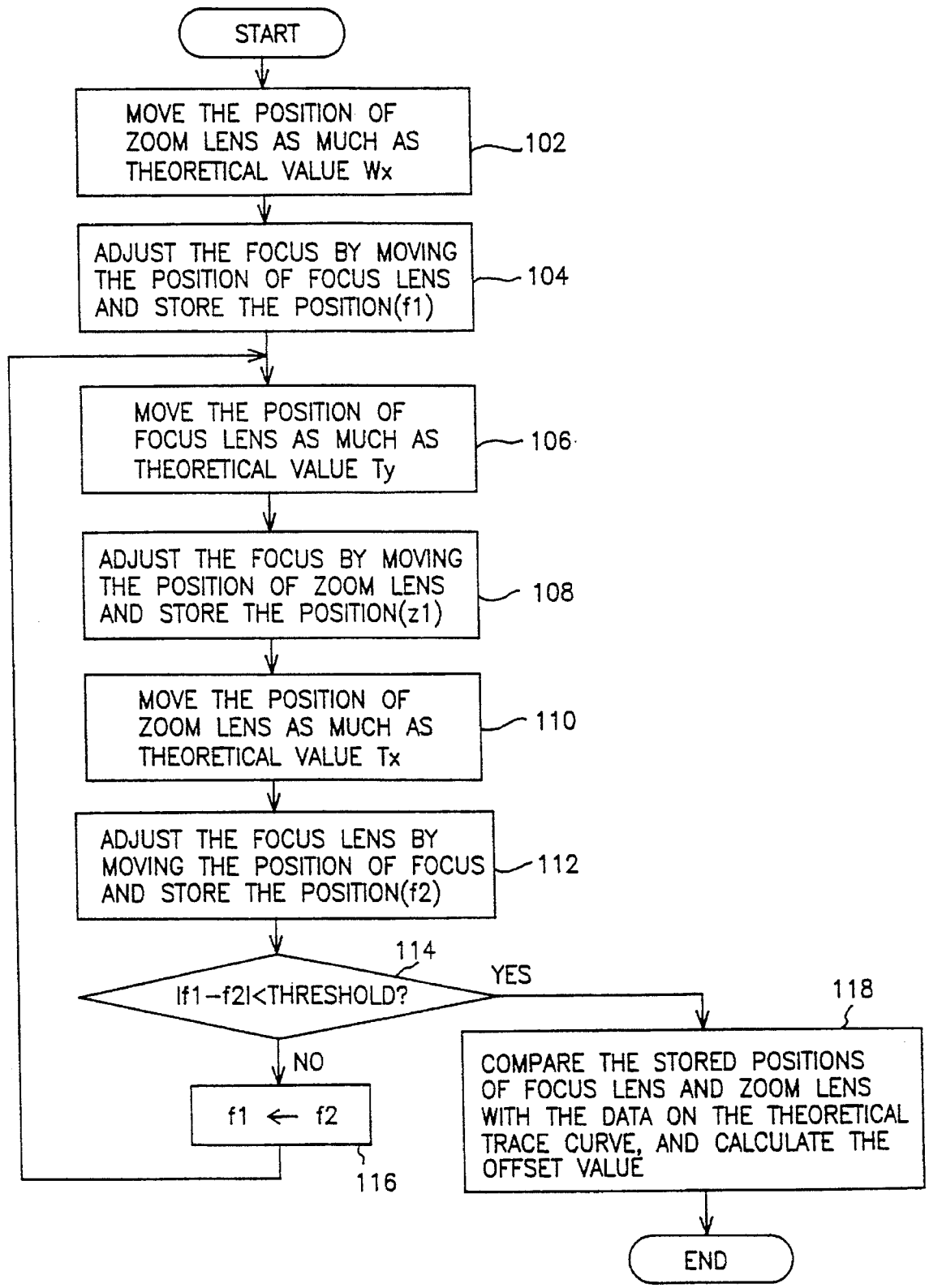
FIG. 4 is a flowchart of the conventional method for calculating an offset value in the conventional video camera.

A method for adjusting a lens offset for a video camera in accordance with the present invention will now be described, referring to the drawings.

First, as shown in FIG. 1, when an image of the object is incident upon a vidicon 30 through lens group 10 and iris 20, the vidicon 30 forms the image of the object and converts the image into the multiplexed chrominance signals.

Next, sampling and gain control unit 40 receives the multiplexed signals outputted from the vidicon 30, and divides the signals into luminance signals and color signals. After signal division, the sampling and gain control unit 40 controls the gains thereof and outputs them to video signal processing unit 50. The luminance signals and the color signals received by the video signal processing unit 50 are encoded into a composite video signal and outputted.

The focus evaluation calculating unit 60 receives the luminance signals having a high frequency component from the sampling and gain control unit 40, and calculates a focus evaluation value by detecting the amount of high frequency component in the luminance signals within a region of the image. After calculation, the focus evaluation calculating unit 60 outputs the focus evaluation value to microprocessor 70.

Therefore, the microprocessor 70 receives the focus evaluation value outputted from the focus evaluation calculation unit 60, and controls motor driving unit 80 to perform an auto-focusing operation.

Figure 5:
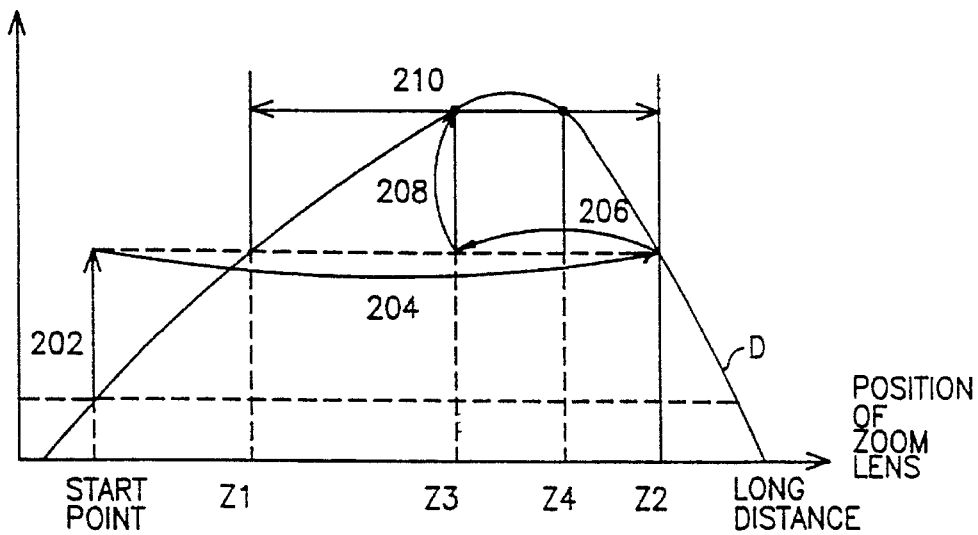
FIG. 5 is an actual trace curve of a focus lens position and a zoom lens position in accordance with the present invention.

The method for calculating the offset value of the focus lens and the zoom lens will be explained, referring to FIGS. 5 to 7.

First, when a user pushes the zoom key through the key input unit 100, the microprocessor 70 moves the position of the focus lens of the lens group 10 by as much as the theoretical value Wy/2 away from a start point by driving the motor driving unit 80 (step 202).

Next, the microprocessor 70 moves the position of the zoom lens of the lens group 10 toward its long-distance position away from the start point by driving the motor driving unit 80. And then, the microprocessor 70 seeks the focusing positions and stores the positions as the first and second positions z1 and z2 of the zoom lens (step 204).

The microprocessor 70 places the zoom lens at the middle point z3 between the first and second positions z1 and z2 of the zoom lens by moving again the zoom lens of the lens group 10 towards the start point (step 206). And then, the microprocessor 70 seeks the focusing point by moving the focus lens toward its long-distance position (step 208).

Thereafter, the microprocessor 70 seeks the focusing points by moving the zoom lens of the lens group 10 from the first position z1 to the second position z2, and stores the focusing positions as the third and fourth positions z3 and z4 of the zoom lens (step 210).

As described above, when the third and fourth positions z3 and z4 of the zoom lens are obtained, the microprocessor 70 calculates an absolute value by subtracting the value of the fourth position z4 from the value of the third position z3. The obtained absolute value is compared with a threshold value (step 212).

If the absolute value is judged larger than the predetermined threshold value, the microprocessor 70 stores the value of the third position z3 of the zoom lens as the value of the first position z1 of the zoom lens, and also stores the value of the fourth position z4 as the value of the second position z2 of the zoom lens (step 214). And then, the microprocessor 70 performs again the operations from steps 206 to 212.

Figure 6:
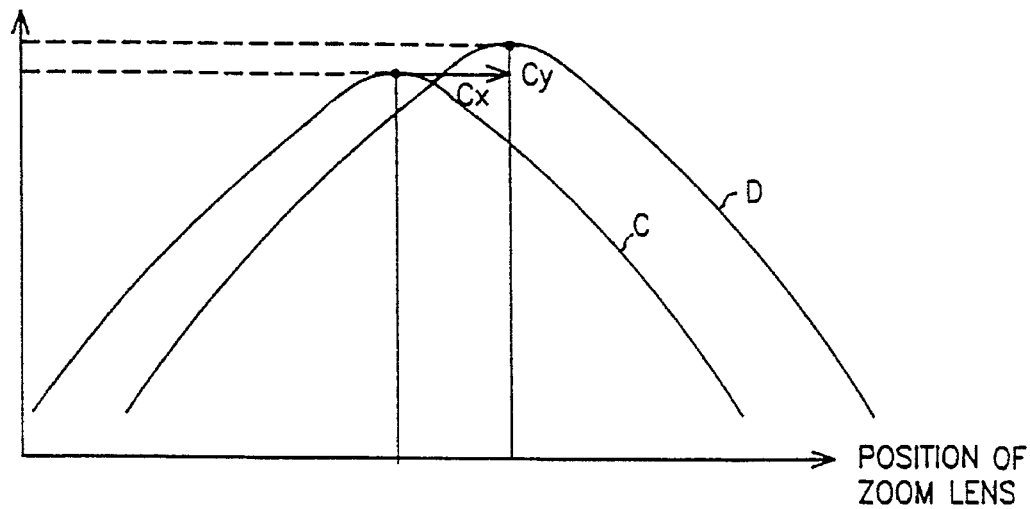
FIG. 6 is a curve for calculating an offset value of the focus lens position and the zoom lens position in FIG. 5.
Figure 7:
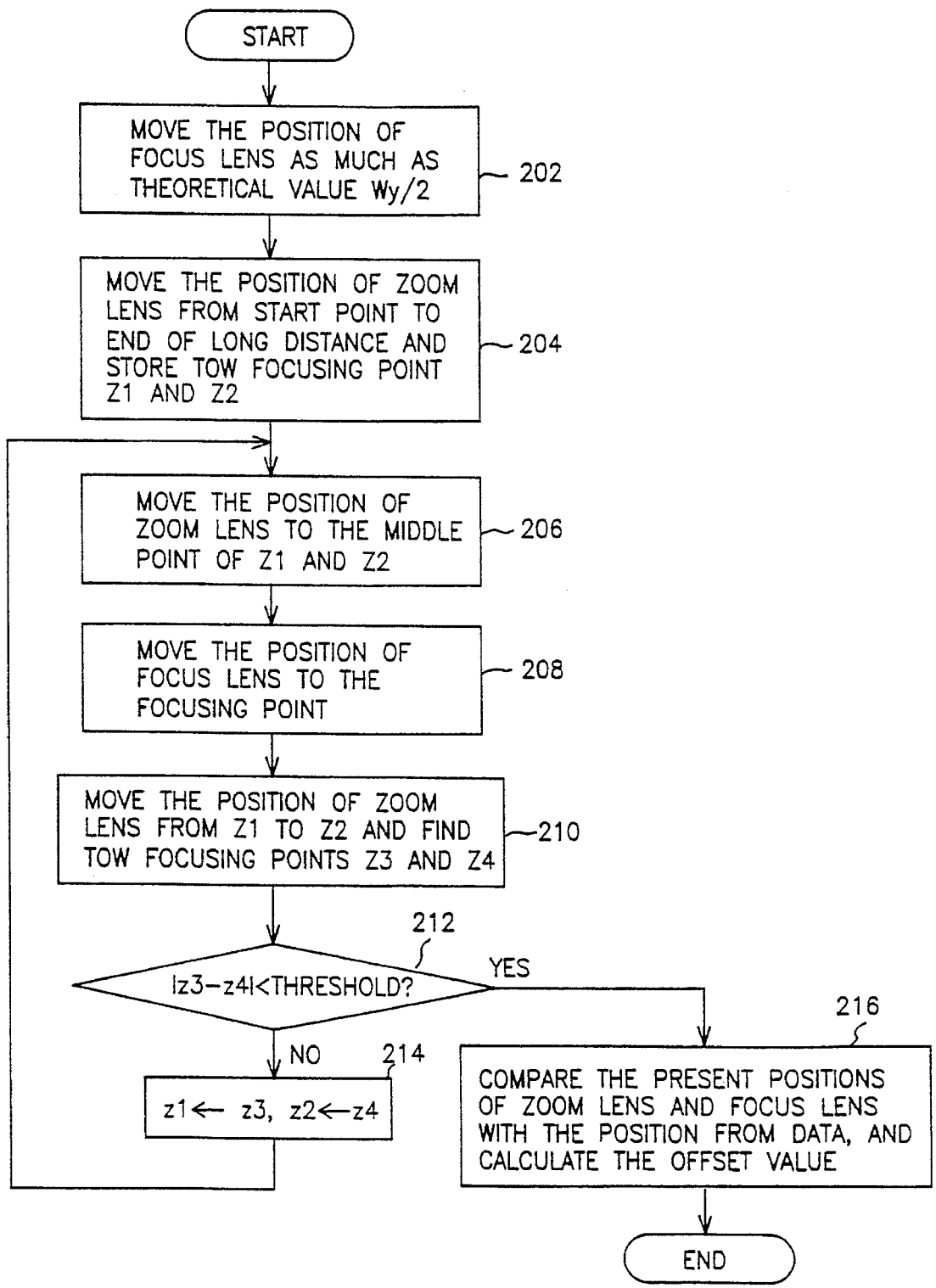
FIG. 7 is a flowchart of the method for calculating the offset value in accordance with the present invention.

Whereas, if the absolute value is judged smaller than the predetermined threshold value, as shown in FIG. 6, the microprocessor 70 calculates the offset values Ox and Oy by comparing the position of the apex of the actual trace curve D with the position of the apex of the theoretical trace curve C, and finishes the operation (step 216).

Therefore, the microprocessor 70 drives the motor driving unit 80 to adjust the offset value of the focus lens and zoom lens of the lens group 10 according to the offset values Ox and Oy.

As hereinbefore described, according to the present invention, the offset value of the lens is calculated quickly and exactly during only a small travel of the focus lens and the zoom lens, and thereby an error can be prevented and the cost of production is curtailed by shortening the time required for calculating the offset value.

What is claimed is:

1. A method for adjusting a lens offset of a video camera comprising;

a first step for seeking first focusing points i.e., first and second positions z1 and z2 of a zoom lens, by moving a position of a focus lens by as much as a predetermined theoretical value away from a start point, and moving a position of the zoom lens toward a first long-distance position encompassing the first focus points from the start point moved position;

a second step for seeking a first focusing point by moving the focus lens toward a second long-distance position encompassing the second focus point after moving the zoom lens to a middle point between the first and second positions of the zoom lens;

a third step for seeking second focusing points i.e., the third and fourth positions z3 and z4, of the zoom lens by moving the zoom lens from the first position z1 to the second position z2; and a fourth step for calculating an absolute value by subtracting the value of the fourth position z4 from the value of the third position z3, calculating an offset value by comparing the absolute value with a predetermined threshold value, and moving the positions of the zoom lens and focus lens in accordance with said offset value.

2. The method of claim 1, wherein said theoretical value of the first step is Wy/2.

3. The method of claim 1, wherein said fourth step further comprises;

after calculating the absolute value by subtracting the value of the fourth position z4 from the value of the third position z3 of the zoom lens and comparing the absolute value with the predetermined threshold value, storing the values of the third and fourth positions z3 and z4 of the zoom lens as the first and second positions z1 and z2, and repeating the operations after said second step of claim 1, if the absolute value is judged larger than the threshold value; and comparing a position of an apex of an actual trace curve with a position of an apex of a theoretical trace curve, and calculating the offset value in accordance therewith, if the absolute value is judged smaller than the threshold value.

* * * * *